(12) United States Patent
Mezes

(10) Patent No.: US 6,641,103 B1
(45) Date of Patent: Nov. 4, 2003

(54) GREASE CANISTER HOLDER

(76) Inventor: David B. Mezes, 994 Madrona St. N. Apartment B, Twin Falls, ID (US) 83301

( * ) Notice: Subject to any disclaimer, the term of this patent is extended or adjusted under 35 U.S.C. 154(b) by 34 days.

(21) Appl. No.: 10/198,390

(22) Filed: Jul. 19, 2002

(51) Int. Cl.[7] .................................................. A47K 1/08
(52) U.S. Cl. ................................ 248/311.2; 248/309.1; 248/314
(58) Field of Search ........................... 248/309.1, 312.1, 248/311.2, 314; 211/63, 75, 87.01, 76, 83, 84, 70.6; 206/209.1, 209, 362, 362.1, 362.3, 205

(56) References Cited

U.S. PATENT DOCUMENTS

| | | | |
|---|---|---|---|
| 2,057,946 A | * | 10/1936 | Harris |
| 2,992,501 A | * | 7/1961 | Douglas |
| 3,575,314 A | * | 4/1971 | Ihienfeld ...................... 220/18 |
| 4,205,620 A | * | 6/1980 | Keys ............................ 116/308 |
| 4,479,502 A | * | 10/1984 | Iversen ......................... 133/1 A |
| 4,995,509 A | * | 2/1991 | Kornfeind ................. 206/209.1 |
| 5,664,718 A | * | 9/1997 | Vine ............................. 224/545 |
| 5,697,127 A | * | 12/1997 | Tyler .............................. 24/3.7 |
| 6,119,854 A | * | 9/2000 | Prentice ................... 206/209.1 |

* cited by examiner

Primary Examiner—Gwendolyn Baxter

(57) ABSTRACT

A grease canister holder provides an improved method of storing one or two standard grease gun cartridges in an accessible location. The grease canister holder stores a plurality of grease canisters in a generally vertical orientation. The device is removably attachable to a vertical surface. The device includes a housing having a bottom wall and a peripheral wall extending upwardly from the bottom wall. A plurality of compartments is attached to and extends downwardly away from the bottom wall. Each of the compartments has a lower wall. The bottom wall has a plurality of openings therein. Each of the openings extends into one of the compartments. A bracket for releasably securing the housing to the vertical surface is attached to the housing.

8 Claims, 3 Drawing Sheets

GREASE CANISTER HOLDER

BACKGROUND OF THE INVENTION

1. Field of the Invention

The present invention relates to grease cartridge containers and more particularly pertains to a new grease cartridge container for fulfilling the need for an improved method of storing one or two standard grease gun cartridges in an accessible location.

2. Description of the Prior Art

The use of grease cartridge containers is known in the prior art. U.S. Pat. No. 5,845,802 describes a grease cartridge carrier for holding a grease cartridge. Another type of grease cartridge container is U.S. Pat. No. 6,000,540 describes a storage box for containing tubular containers. U.S. Pat. No. 5,690,246 describes a security container for storing sample containers. U.S. Pat. No. Des. 308,025 describes an ornamental design for grease cartridge package. U.S. Pat. No. 5,799,790 describes a thermoformed tray for the packaging of syringe barrels.

While these devices fulfill their respective, particular objectives and requirements, the need remains for a device that has the ability to hold one or more grease cartridges.

SUMMARY OF THE INVENTION

The object of the present invention is to provide a new grease cartridge container that could be installed in a matter of minutes using a common drill and screwdriver to the body of a vehicle so that it is easily accessible when grease is needed for the vehicle.

Another object of the present invention is to provide a new grease cartridge container that would prevent comparatively fragile tubes from being crushed, punctured, or otherwise damaged, thereby preventing their contents from leaking out and contaminating the environment.

To this end, the present invention generally comprises a grease canister holding for holding a plurality of grease canisters in a generally vertical orientation. The device is removably attachable to a vertical surface. The device includes a housing that has a bottom wall and a peripheral wall extending upwardly from the bottom wall. A plurality of compartments is attached to and extends downwardly away from the bottom wall. Each of the compartments has a lower wall. The bottom wall has a plurality of openings therein. Each of the openings extends into one of the compartments. A bracket for releasably securing the housing to the vertical surface is attached to the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
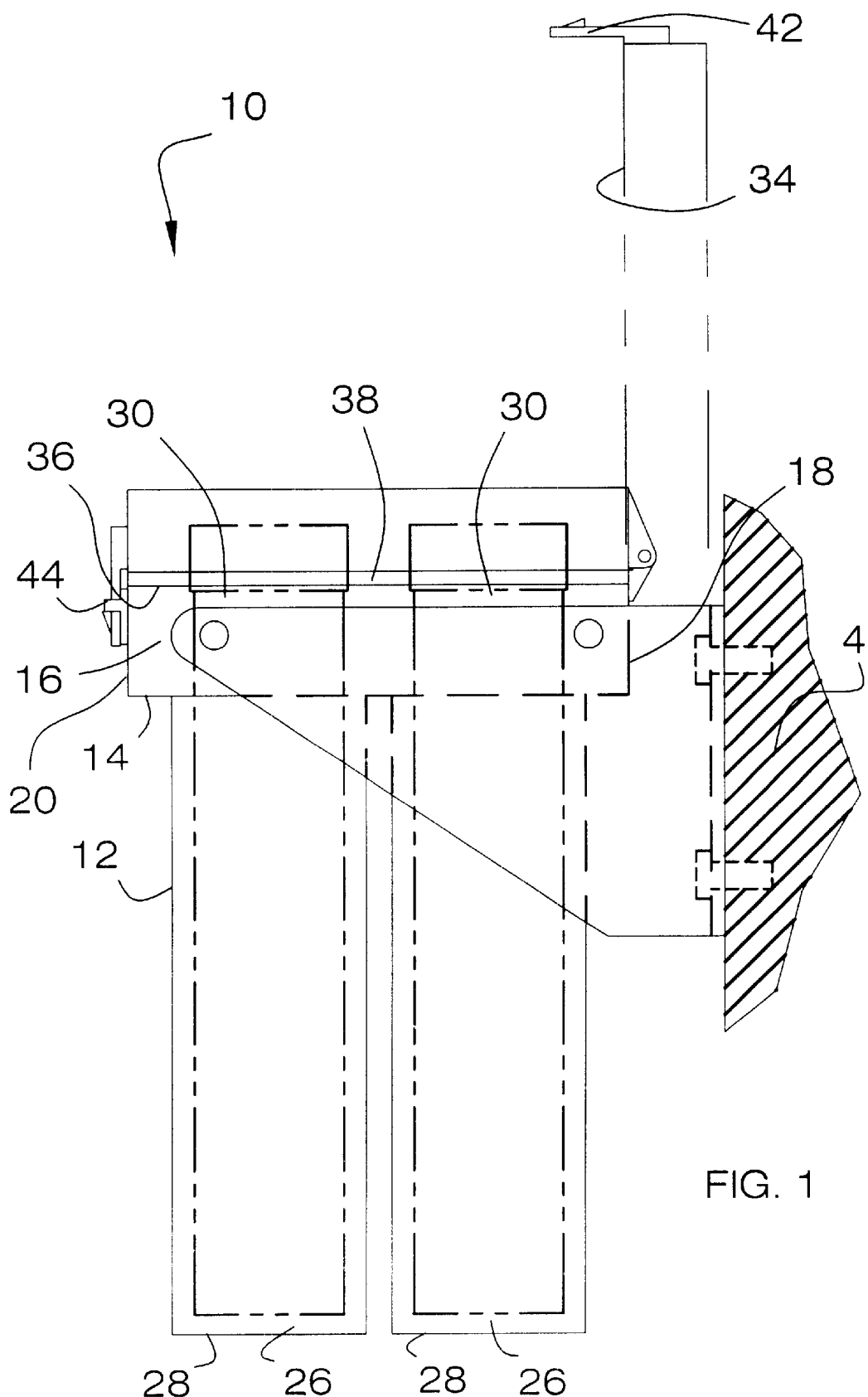
FIG. 1 is a side cross-sectional view of a grease canister holder according to the present invention.
Figure 2:
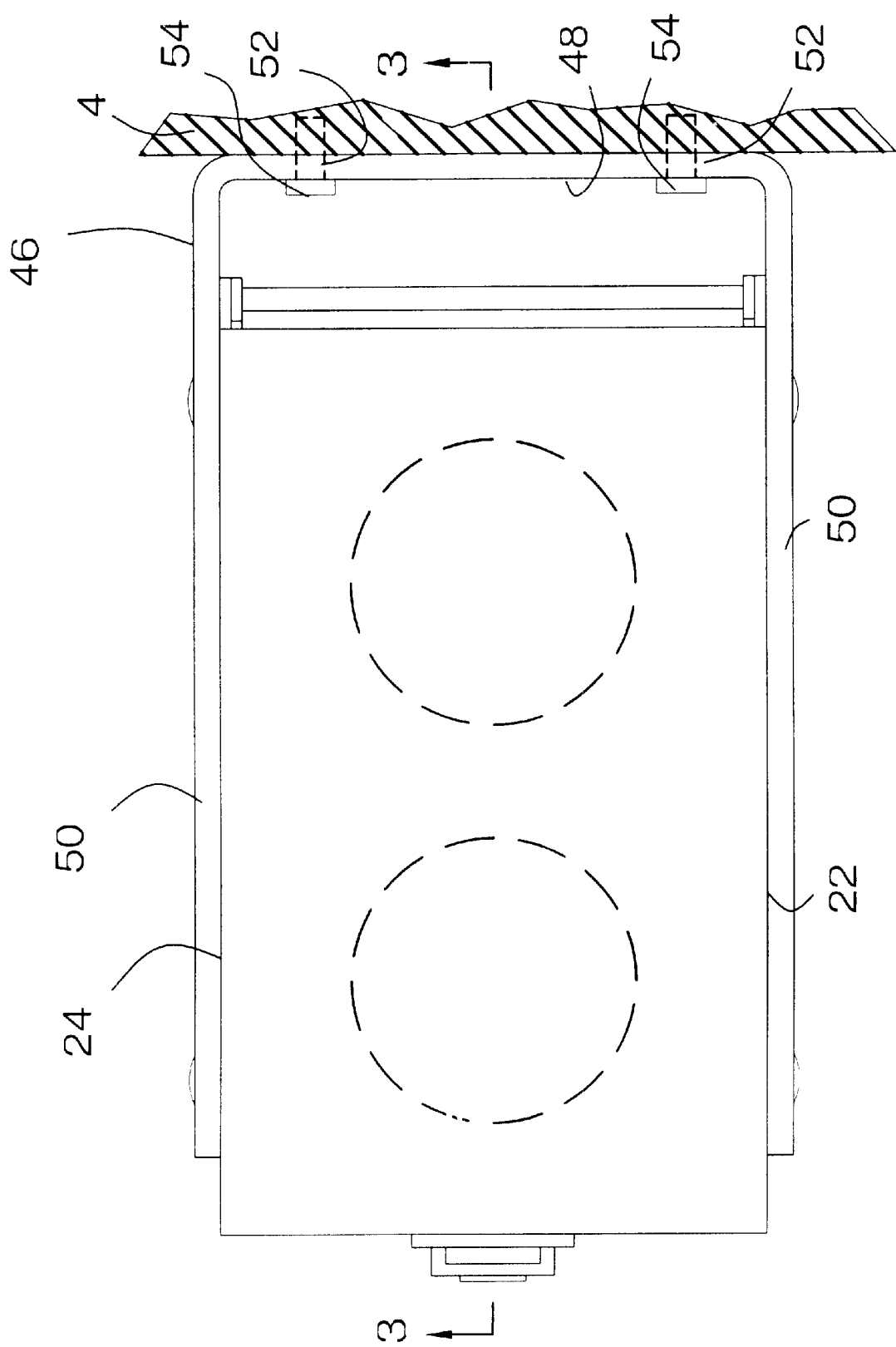
FIG. 2 is a topview of the present invention.
Figure 3:
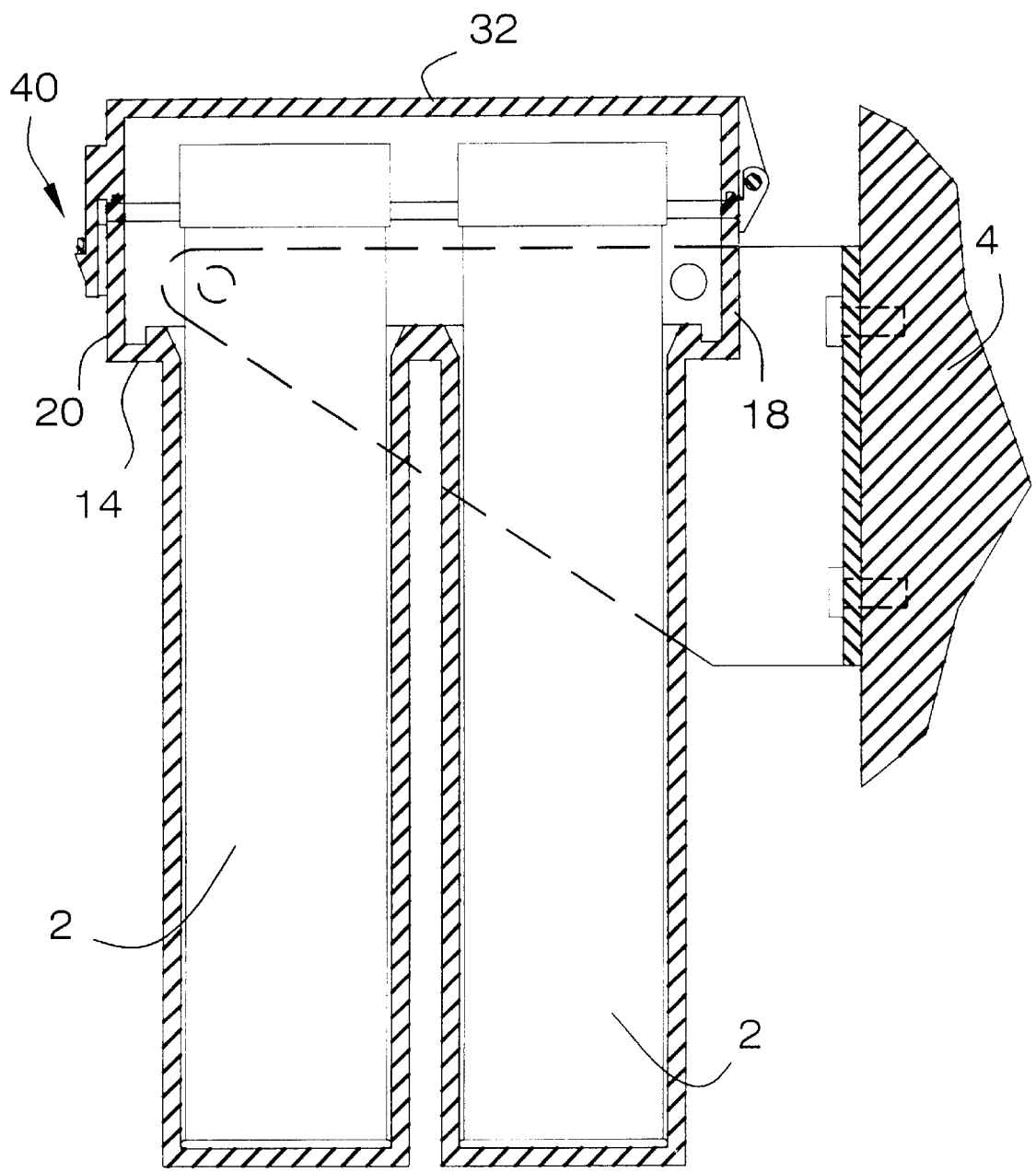
FIG. 3 is a cross-sectional view taken along the line 3—3 of FIG. 2 of the present invention.

With reference now to the drawings, and in particular to FIGS. 1 through 3 thereof, a new grease cartridge container embodying the principles and concepts of the present invention and generally designated by the reference numeral 10 will be described.

As best illustrated in FIGS. 1 through 3 is a grease canister holder 10 for holding a plurality of grease canisters 2 in a generally vertical orientation. The device 10 is removably attachable to a vertical surface 4. The vertical surface 4 can be a wall or the side of a vehicle. The device 10 includes a housing 12 that has a bottom wall 14 and a peripheral wall 16 that extends upwardly from the bottom wall 14. The peripheral wall 16 includes a back wall 18, a front wall 20, a first side wall 24 and a second side wall 24.

A plurality of compartments 26 is attached to and extends downwardly away from the bottom wall 14. Each of the compartments 26 has a lower wall 28. The bottom wall 14 has a plurality of openings 30 therein. Each of the openings 30 extends into one of the compartments 26. Each of the openings 30 has a generally circular shape. Each of the compartments 26 has a generally cylindrical shape. The compartments 26 have a size adapted for receiving and holding one of the grease canisters 2. The plurality of compartments 26 preferably includes two compartments 26 though more compartments are envisioned for holding additional grease canisters 2.

A cover 32 is hingedly coupled to the peripheral wall 16. The cover 32 has a size and shape that is adapted for selectively opening and closing the housing 12. The cover 32 has a bottom edge 34 positionable against and extending along an upper edge 36 of the peripheral wall 16 when the cover 32 is in a closed position covering the housing 12.

Preferably, a seal 38 is attached to and extends around the upper edge 36 of the peripheral wall 16. Ideally the seal comprises an elastomeric material.

A securing assembly 40 selectively secures the cover 32 in a closed position. The securing assembly 40 includes a latch 42 attached to the cover 32 and a receiving member 44 for receiving the latch 42 attached to the housing 12.

A bracket 46 is for releasably securing the housing 12 to the vertical surface 4. The bracket 46 has a middle section 48 and a pair of legs 50 attached to opposite ends of the middle section 48. The legs 50 are orientated generally perpendicular to the middle section 48. Each of the legs 50 is attached to one cf the first 22 and second 24 side walls of the housing 12. The middle section 48 has a plurality of holes 52 that extend therethrough for receiving coupling means 54 for releasably securing the middle section 48 to the vertical surface 4. The coupling means 54 may be bolts, screws, nails or other like couplers.

In use, the grease canister holder 10 would be utilized for holding a plurality of grease canisters 2. The device 10 can be mounted on a vertical surface 4 in an area where the grease canisters 2 are needed. The present invention would prevent partially consumed cartridges 2 from becoming contaminated with dust, dirt, and other debris and the seal would ensure that the grease does not dry out.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grease canister holding device for holding a plurality of grease canisters in a generally vertical orientation, said device being removably attachable to a vertical surface, said device comprising:
   a housing having a bottom wall and a peripheral wall extending upwardly from said bottom wall;
   a plurality of compartments being attached to and extending downwardly away from said bottom wall, each of said compartments having a lower wall, said bottom wall having a plurality of openings therein, each of said openings extending into one of said compartments;
   a bracket for releasably securing said housing to the vertical surface, said bracket being attached to said housing;
   a cover being hingedly coupled to said peripheral wall, said cover having a size and shape adapted for selectively opening and closing said housing, said cover having a bottom edge positionable against and extending along an upper edge of said peripheral wall; and
   a seal being attached to and extending around said upper edge of said peripheral wall.

2. The grease canister holding device as in claim 1, wherein the said peripheral wall includes a back wall, a front wall, a first side wall and a second side wall, said bracket having a middle section and a pair of legs attached to opposite ends of said middle section, said legs being orientated generally perpendicular to said middle section, each of said legs being attached to one of said first and second side walls, said middle section having a plurality of holes extending therethrough for receiving coupling means for releasably securing said middle section to the vertical surface.

3. The grease canister holding device as in claim 1, wherein each of said openings in said bottom wall has a generally circular shape, each of said compartments having a generally cylindrical shape, each of said compartments having a size adapted for receiving and for holding one of the grease canisters.

4. The grease canister holding device as in claim 3, wherein said plurality of compartments comprises two compartments.

5. The grease canister holding device as in claim 1, wherein said plurality of compartments comprises two compartments.

6. The grease canister holding device as in claim 1, further including a securing assembly for selectively securing said cover in a closed position.

7. The grease canister holding device as in claim 6, wherein said securing assembly includes a latch attached to said cover and a receiving member for receiving said latch attached to said housing.

8. A grease canister holding device for holding a plurality of grease canisters in a generally vertical orientation, said device being removably attachable to a vertical surface, said device comprising:
   a housing having a bottom wall and a peripheral wall extending upwardly from said bottom wall, said peripheral wall including a back wall, a front wall, a first side wall and a second side wall;
   a plurality of compartments being attached to and extending downwardly away from said bottom wall, each of said compartments having a lower wall, said bottom wall having a plurality of openings therein, each of said openings extending into one of said compartments, each of said openings having a generally circular shape, each of said compartments having a generally cylindrical shape, each of said compartments having a size adapted for receiving and for holding one of the grease canisters, said plurality of compartments comprising two compartments;
   a cover being hingedly coupled to said peripheral wall, said cover having a size and shape adapted for selectively opening and closing said housing, said cover having a bottom edge positionable against and extending along an upper edge of said peripheral wall;
   a seal being attached to and extending around said upper edge of said peripheral wall;
   a securing assembly for selectively securing said cover in a closed position, said securing assembly including a latch attached to said cover and a receiving member for receiving said latch attached to said housing; and
   a bracket for releasably securing said housing to the vertical surface, said bracket having a middle section and a pair of legs attached to opposite ends of said middle section, said legs being orientated generally perpendicular to said middle section, each of said legs being attached to one of said first and second side walls, said middle section having a plurality of holes extending therethrough for receiving coupling means for releasably securing said middle section to the vertical surface.

* * * * *